United States Patent [19]

Alves

[11] Patent Number: 4,558,217

[45] Date of Patent: Dec. 10, 1985

[54] MULTIPLEXING AND CALIBRATION TECHNIQUES FOR OPTICAL SIGNAL MEASURING INSTRUMENTS

[75] Inventor: Ronald V. Alves, Palo Alto, Calif.

[73] Assignee: Luxtron Corporation, Mountain View, Calif.

[21] Appl. No.: 468,189

[22] Filed: Feb. 25, 1983

Related U.S. Application Data

[63] Continuation-in-part of Ser. No. 357,645, Mar. 12, 1982, abandoned.

[51] Int. Cl.[4] ............................................. G02B 5/14
[52] U.S. Cl. .................................. 250/227; 374/161; 250/231 R
[58] Field of Search ............................. 374/131, 161; 350/96.20, 96.21, 96.22; 250/227, 231 R, 461.1; 455/610-612; 362/32, 268

[56] References Cited

U.S. PATENT DOCUMENTS

| | | | |
|---|---|---|---|
| 2,546,160 | 3/1951 | Lengyel | 250/461 X |
| 2,551,650 | 5/1951 | Urbach | 73/355 R |
| 2,656,479 | 10/1953 | Brown | 313/271 X |
| 2,718,597 | 9/1955 | Heigl et al. | 250/252.1 |
| 2,987,704 | 6/1961 | Gimpel et al. | 346/34 X |
| 3,139,752 | 7/1964 | Giedt | 73/341 X |
| 3,256,518 | 6/1966 | Crane | 73/356 X |
| 3,286,524 | 11/1966 | Malone | 73/355 R X |
| 3,617,745 | 11/1971 | Reed | 374/132 X |
| 3,798,366 | 3/1974 | Hunt et al. | 178/6.8 |
| 3,925,727 | 12/1975 | Duguay | 250/227 |
| 3,932,023 | 1/1976 | Humer | 350/171 |
| 3,935,463 | 1/1976 | Jacobsen | 356/244 X |
| 3,941,487 | 3/1976 | Ehret et al. | 356/244 X |
| 4,016,761 | 4/1977 | Rozzell et al. | 73/356 |
| 4,030,362 | 6/1977 | Dimeff | 374/129 |
| 4,061,578 | 12/1977 | Kleinerman | 250/330 |
| 4,062,043 | 12/1977 | Zerdler et al. | 358/86 |
| 4,075,493 | 2/1978 | Wickersheim | 250/461 R |
| 4,122,719 | 10/1978 | Carlson et al. | 73/342 |
| 4,145,142 | 3/1979 | Mikeman | 250/252.1 X |
| 4,162,399 | 7/1979 | Hudson | 250/231 SE |
| 4,170,731 | 10/1979 | Howell et al. | 250/227 |
| 4,215,275 | 7/1980 | Wickersheim | 250/459 |
| 4,223,217 | 9/1980 | Bongard et al. | 250/227 |
| 4,223,226 | 9/1980 | Quick et al. | 73/355 R X |
| 4,229,798 | 10/1980 | Rosie et al. | 364/571 X |
| 4,245,507 | 1/1981 | Samulski | 374/159 |
| 4,249,076 | 2/1981 | Bergstrom et al. | 250/231 R |
| 4,278,349 | 7/1981 | Sander | 356/44 |
| 4,302,970 | 12/1981 | Snitzer et al. | 73/339 R |
| 4,303,984 | 12/1981 | Houvig | 364/558 |
| 4,304,461 | 12/1981 | Stewart et al. | 350/96.18 |
| 4,313,344 | 2/1982 | Brogardh et al. | 374/129 X |
| 4,334,774 | 6/1982 | Glass et al. | 250/338 X |
| 4,349,886 | 9/1982 | Ibar | 364/571 X |
| 4,367,040 | 1/1983 | Goto | 250/231 R |
| 4,394,714 | 7/1983 | Rote | 362/32 |
| 4,409,476 | 10/1983 | Löfgren et al. | 250/227 |

OTHER PUBLICATIONS

Publ. "Automatic Self Certification of a Computer-Controlled Calibration System" by Seeley et al, IREE Transactions of Inst., vol. 1M-19, No. 4, 11/1970, pp. 245-252.
"Recent Advances in Optical Temperature Measurement", by Wickersheim et al. (Luxtron Corp.) 8 pages, 12/1979.
Publ. "Model 1000A Fluoroptic Thermometer" Luxtron Corporation, 7/1980, Bulletin (1 sheet).
"Ratioing Fluoroptic Temp. Sensor For Induced Hyperthermia" by Wickersheim et al., 6 pages, 6/1980.
Publ. "Recent Advances in Optical Temperature Measurement", Wickersheim & Alves, Industrial Research-/Development; 12/1979.

Primary Examiner—David C. Nelms
Assistant Examiner—J. Jon Brophy
Attorney, Agent, or Firm—Majestic, Gallagher, Parsons & Siebert

[57] ABSTRACT

An optical temperature measuring instrument for detecting illuminescense of phosphor temperature sensing elements, wherein a two or more point temperature calibration system allows compensating for different temperature sensor characteristics, and a single optical system is utilized for simultaneously reading the temperatures of a plurality of temperature sensors in a multiplexing arrangement.

11 Claims, 10 Drawing Figures

MULTIPLEXING AND CALIBRATION TECHNIQUES FOR OPTICAL SIGNAL MEASURING INSTRUMENTS

CROSS-REFERENCE TO RELATED APPLICATION

This is a continuation-in-part of copending application Ser. No. 357,645, filed Mar. 12, 1982, now abandoned.

BACKGROUND OF THE INVENTION

This invention relates generally to the acquisition and processing of optical signals derived from measuring transducers, utilized, for example, in an electro-optic instrument that detects and displays temperature from an optical temperature transducer.

Many particular techniques have been suggested for optically measuring the temperature of an object or an environment. A material that exhibits a change in some optical property is either applied directly to the object or made as part of a temperature probe, such as a probe formed on the end of an optical fiber. One such material is a phosphor that exhibits some change in its light emission as a function of its temperature in response to appropriate radiation excitation. Measuring the decay time of a phosphor emission after a pulse of exciting radiation, and the measurement of phosphor emission color chift as a function of temperature are two such methods that are described in U.S. Pat. No. 4,223,226—Quick et al. (1980). A decay time technique is also disclosed in U.S. Pat. No. 4,245,507—Samulski (1981).

Other techniques utilize varying phosphor emission intensity as a function of temperature. The emission intensity is measured as an indicator of phosphor temperature. One particular form of the intensity measuring technique having many advantages is described in U.S. Pat. Nos. 4,075,493—Wickersheim (1978) and 4,215,275—Wickersheim (1980), assigned to Luxtron Corporation, the assignee of the present application. These patents show as a preferred technique the use of a phosphor which, when excited to luminescence, emits detectable radiation within two or more distinct wavelength ranges that are optically isolatable from one another, the relative intensity of emission in these wavelength ranges varying in a known manner as a function of the temperature of the phosphor. The preferred phosphor is one that emits sharp lines of radiation upon excitation, such as those having rare earth activators. A temperature measuring system utilizing such a phosphor preferably takes the ratio of emissions within two optically separable emission bands, and it is the ratio that is a function of the temperature of the phosphor. Ratioing minimizes many sources of error in the measurement, such as changes in the excitation source intensity, phosphor characteristics over time, or changes in the optical transmission system, such as an optical fiber, that communicates the phospor emission to a detecting instrument.

Various approaches to optical temperature measurement are discussed in a published paper, which includes a description of an instrument sold by Luxtron Corporation, "Recent Advances in Optical Temperature Measurement", Wickersheim and Alves, *Industrial Research/Development*, December, 1979. The Luxtron instrument that has been marketed for some time utilizes an optical assembly positioned between an end of an optical fiber probe assembly and two detectors. These optics select two different groups of emission lines of the phosphor temperature sensor and direct the emission of one group of lines to one of the detectors and the other group of lines to the other of the detectors. These same optics direct ultraviolet radiation of a different wavelength into the optical fiber for exciting to emission the phosphor temperature sensor at the other end.

It is object of the present invention to provide optical multiplexing techniques for simultaneously handling multiple temperature sensors.

It is another object of the present invention to provide multiplexing and calibration techniques that are advantageous in acquiring a wide variety of optical signals originating from various types of transducers that measure temperature, pressure, flow, stress, strain and similar parameters.

SUMMARY OF THE INVENTION

These and additional objects are accomplished by the various aspects of the present invention wherein briefly, according to one aspect, multiplexing is provided for the simultaneous acquisition of several independent optical signals. Many measuring applications require readings to be taken substantially simultaneously at two or more locations. An improved structure for handling multiple optical signals is to physically group them together in a small bundle, such as by grouping together ends of optical fibers, and then to image these signals onto multiple individual detectors by common optical elements; that is, the multiple optical signals are imaged as one image onto multiple individual detectors from which electrical signals are independently obtained. An optional integrating sphere is used to provide exciting radiation to multiple transducers at the end of optical fibers, in those applications requiring exciting radiation such as with phosphor temperature transducers.

Additional features, objects and advantages of the various aspects of the present invention will become apparent from the following detailed description of preferred embodiments thereof, which description should be taken in conjunction with the accompanying drawings. The various aspects of the present invention are explained as improvements in the luminescent intensity ratioing technique of the Luxtron Corporation instruments but it should be understood that the various aspects of the present invention are equally applicable to temperature measuring instruments operating by the luminescent decay time and frequency shift detecting techniques, as well as to other optical measuring techniques for temperature and other parameters such as pressure, flow, stress, strain, etc. The improvements herein are also applicable to infra-red imaging techniques of the type described in U.S. Pat. No. 4,061,578—Kleinerman (1977).

DESCRIPTION OF THE PREFERRED EMBODIMENTS

Figure 1:
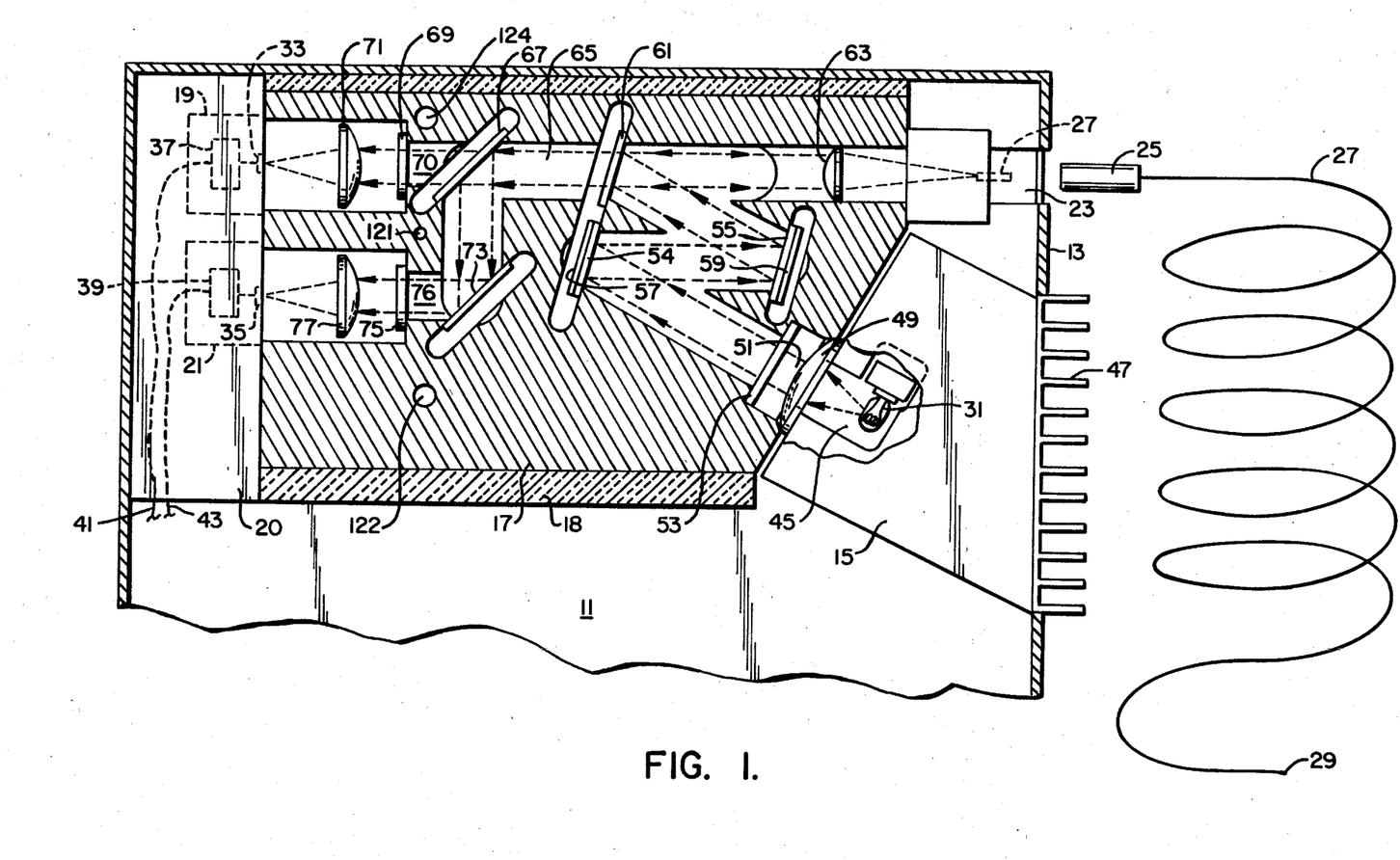
FIG. 1 is a top view of a portion of an instrument in which the various aspects of the present invention are embodied, with certain portions cut away to show the optical system therein.

Referring initially to FIG. 1, certain portions of a complete optical temperature measuring instrument that utilize the various aspects of the present invention are shown. An instrument housing 11 includes upright sides, such as a back wall 13. Inside the overall instrument housing is a light source housing block 15, an optical housing 17, detector assemblies 19 and 21, and an optical fiber connector receptacle 23. A standard type of available optical fiber connector 25 is attached to a length 27 of a single optical fiber, although a bundle of optical fibers could be used as well. The optical housing 17 is surrounded by a layer 18 of insulation and is maintained at a uniform temperature by heaters 122 and 124 that are controlled by a thermocouple 121.

At a free end 29 of the optical fiber 27 is an optical temperature sensor. The sensor includes a small amount of phosphor material attached to the end of an optical fiber and encapsulated, the details of which are disclosed in the aforementioned Wickersheim patents. Alternatively, the luminescent signal can be obtained from phosphor spaced a distance from the optical fiber end but optically coupled with the end. For the specific example of an instrument being described herein, the phosphor utilized is europium-doped lanthanum oxysulfide. This rare-earth phosphor is excited by passing ultraviolet radiation from the instrument down the optical fiber 27. Visible radiation emitted from the phosphor is then passed back along the optical fiber 27 to the instrument. Two groups of sharp emission lines are, in this specific example, utilized by the instrument to determine the temperature of the phosphor sensor 29. These groups include red lines around 7043 angstroms and yellow lines around 5860 angstroms. The emission intensity in these lines vary independently of each other as a function of phosphor temperature. The ratio of these intensities varies in a known way as a function of temperature.

The connector 25, when captured by the receptacle 23 that is accessible from the rear of the instrument, places the optical fiber 27 in optical communication with the instrument. A light source 31 provides the phosphor exciting ultraviolet radiation. Ultraviolet radiation is preferred for the particular embodiment being described but other radiation bands could be selected for this and other embodiments. For example, longer wavelengths such as blue or green are appropriate exciting rasiation for very long optical fibers. Visible exciting radiation is also advantageously used when fluorescence of plastic optical elements excited by ultraviolet radiation is a problem. The optics within the housing 17 selects the red emission lines and applies it to a photodetector 33. Similarly, the optics selects the yellow emission lines and applies it to a detector 35. An electrical signal from each of these detectors that is proportional to the intensity of the light striking them within their respective restricted wavelength ranges, is amplified by individual pre-amplifiers 37 and 39 whose amplified outputs appear in circuits 41 and 43, respectively. Each of the preamplifier and detector units are preferably formed as a unitary structure that is shielded from interference by stray fields.

The optics for the source radiation will now be described. A quartz lens 49 takes the light emitted from the small filament of the bulb 31 and collimates it into a beam 51 that is initially passed through a filter 53 that is designed to block all but the excitation frequencies, in this specific example being within the ultra-violet range. In order to further eliminate radiation outside the ultraviolet range, particularly the radiation to which the detectors are sensitive, the beam is reflected off three dichroic mirrors 54, 55 and 61 held in tandem. These mirrors are selected to be highly reflective to excitation radiation while allowing the detected wavelengths to pass through them. Absorbing coatings 57 and 59 are applied to the back of two of these mirrors. The excitation light is then reflected from the third dichroic mirror 61 to a quartz lens 63 that focuses the collimated beam onto the end of the optical fiber 27 that is positioned within the receptacle 23.

The optical system for the visible radiation that enters from the optical fiber 27 will now be described. The mirror 61 and lens 63 are common both to the return fluorescence light path and the excitation radiation path. The lens 63 takes the light at the end of the optical fiber 27 and collimates it, directing the collimated beam against the mirror 61. The dichroic mirror 61 is chosen to have a crossover wavelength such that it is highly reflective to the ultraviolet source radiation but highly transmissive to the visible radiation, thereby resulting in the visible fluorescent radiation passing through it as a beam 65. The dichroic mirror 61 thus also acts as a filter, reflecting any ultra-violet radiation back to the source and keeping it from reaching the detector region.

The radiation beam 65 contains the full spectrum of visible fluorescent radiation from the phosphor temperature sensor. Since only narrow wavelength ranges are of interest, additional optical elements are provided to separate the wavelengths of interest from the broad visible spectrum in the beam 65. A dichroic mirror 67 is selected in this particular example to transmit through a filter 69 and a lens 71 the red emission lines of interest to the detector 33. The dichroic mirror 67 is selected to reflect the yellow emission lines of interest onto a regular mirror 73 and thence through a filter 75 and then focused by lens 77 on the small area detector 35. The filters 69 and 75, respectively, are designed to pass a narrow bandwidth of the red and yellow emission lines of interest.

Figure 2:
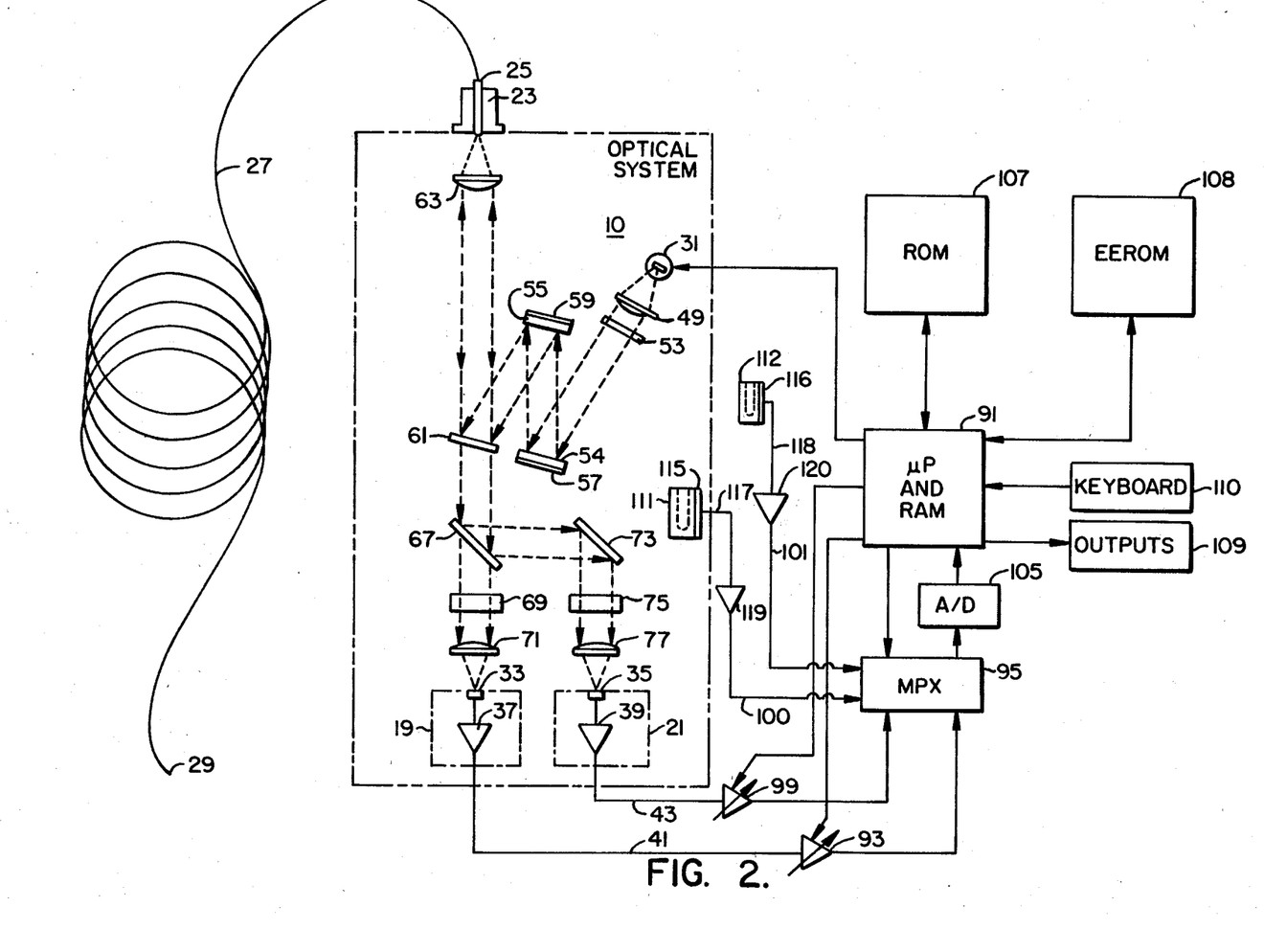
FIG. 2 is a schematic representation of the optical system of FIG. 1, and in addition shows schematically the electronic system that operates with the optical elements.

Referring to FIG. 2, an electronic system is illustrated in general terms that cooperates with the optical system described to process the information from it and to control its operation. A ratio is taken of the analog signal levels in the circuits 41 and 43, and it is that ratio that is related to the temperature of the phosphor in the sensor 29 in a known way. There are many standard ways of implementing an electronic system for taking the ratio and converting to an equivalent temperature. A simple analog system could be utilized or it could even be done by hand if the voltage levels in the circuits 41 and 43 were independently measured. But with the current sophistication in digital electronics and the wide availability of circuit chips makes a digital implementation preferred. Further, the use of a microprocessor 91 as a central controlling element of the system is desired.

The signal voltage in the circuit 41 is amplified by amplifier 93 which has a variable gain. The output of that amplifier is applied directly to a digital multiplexer 95; similarly, the other circuit 43 is applied to an input of a variable gain amplifier 99 whose output is applied directly as another input to the multiplexer 95.

Figures 3, 9A:
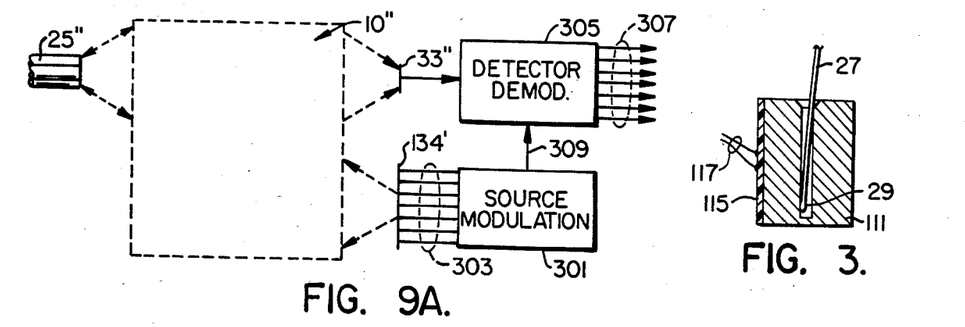
FIG. 3 shows in sectional view a temperature calibrating well of the instrument of FIGS. 1 and 2.
FIG. 9A illustrates another variation of a system according to FIGS. 4–7.

Separate standard temperature wells 111 and 112 are schematically illustrated in FIG. 2, their identical construction being shown in FIG. 3 by a sectional view of the well 111. The well 111 is preferably made of a heat conductive material, such as aluminum, and is of sufficient mass to have considerable thermal inertia. A small hole drilled into the metal is used to receive the temperature sensor 29 which, through the instrument, then reads the temperature within the well 111. On the side of the well 111, is a semiconductor device 115 installed in a groove provided in the metal. The device 115 allows a signal to be developed in the circuit 117 that is proportional to the temperature of the well 111, and thus of the phosphor temperature sensor 29 positioned in it. The signal in the circuit 117 is amplified by an amplifier 119 and applied by a circuit 100 as a third input to the multiplexer 95. Similarly, the well 112 has a temperature measuring semiconductor element 116 which is connected by a circuit 118 to an amplifier 120, and thence through a circuit 101 to the multiplexer 95 as a fourth input.

The temperature wells 111 and 112 are utilized for calibrating the instrument. By developing an electrical signal proportional to its temperature, the system can automatically calibrate itself. In order to maintain the two standard temperature wells 111 and 112 at different temperatures, the well 111 is placed in close proximity, and preferably in contact with, the thermally conductive block 17. This will maintain the well 111 at an elevated temperature. The reference temperature well 112 is positioned within the instrument a distance removed from the block 17 and is maintained at a cooler temperature, nearer to the room ambient temperature. For medical temperature measuring applications, the temperatures of the two wells can be set near the extremes of temperatures to be measured, thus facilitating a two point calibration technique described below.

The multiplexer 95 (FIG. 2) selectes one of the four inputs at a time under the control of the microprocessor 91. The selected input is then converted from its analog form to a digital form by a converter 105. The output, in digital form, of the analog-to-digital converter 105 is utilized by the microprocessor 91 as an input data from which the temperature of the sensor 29 is determined and the instrument is calibrated. The microprocessor 91 operates under the control of a read only memory 107. An electrically erasable read-only-memory (EEROM) 108 is used to store a temperature look-up table, described below. Output circuits 109 receive the processed information from the microprocessor 91 and include the output in the form desired for any particular application. Most commonly, there would be a dislay so that the user of the instrument can read the temperature of the sensor. The temperature information in digital form could also, or alternatively, be applied to other digital processing equipment. The output circuits 109 could also, or alternatively, include a digital-to-analog converter for driving a chart recorder. A keyboard 110 is provided for inputing information and commands to the system.

So far in this description, an instrument capable of measuring one temperature at a time through a single temperature sensor 29 has been described. Referring to FIGS. 4-9, techniques for adapting the instrument to measure multiple temperatures is shown. Rather than the single optical fiber input 25 of FIG. 2, FIGS. 4-6 show a modification wherein a plurality of optical fiber ends 25' are utilized, each carrying an independent optical signal. In this example, six optical fibers are closely packed around a central core fiber, all of them having the same cross-sectional dimensions. Each of these fibers is optically coupled at its opposite end (not shown) to a phosphor temperature sensor of the type described previously. Each temperature sensor may be positioned at a unique place in an object that is monitored, or on different objects. The independent optical signals from each sensor are then imaged by an optical system 10' onto a detector surface 33'. The optical system 10' can be made essentially the same as the optical system 10 described previously with respect to FIGS. 1 and 2. The closely grouped optical fibers are positioned at the optical axis of the system 10' in order to avoid distortion and aberrations. A small, compact image located at the optical axis of various optical element means that these elements can be made inexpensively.

Figure 6:
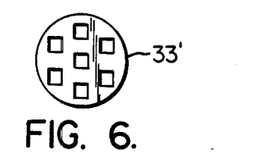
FIG. 6 is a view of the optical system of FIG. 4 taken at section 6—6 thereof.

The detector surface 33' preferably has an integrated multi-detector element positioned coincident with it, this element being shown in FIG. 6. Seven independent detectors are arranged so that each receives the light from one of the optical fibers 25'. The electrical signals generated are processed in the same manner discussed previously, either at the same time with parallel paths of equipment or, preferably, one at a time in rapid sequence by a common microprocessor based system of the type shown in FIG. 2.

Figure 5:
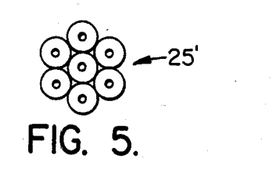
FIG. 5 is a view of the optical system of FIG. 4 taken at section 5—5 thereof.

Alternative to an integrated detector element shown in FIG. 6, a bundle of optical fibers in the shape of the fibers 25' shown in FIG. 5 can be positioned at the surface 33' in place of the integrated detector to receive each of the individual signals. An opposite end of each optical fiber could then contain a discrete detector component. The fibers are fanned out from the small small bundle where it receives the image, to their ends containing the detectors. This structure has the advantage of giving more room for the detectors while still maintaining a very small optical image of the array of signals.

The optical fibers 25' can be fanned out and each connected individually to a length of optical fiber with a temperature sensor on its end. That is, each of the optical fibers of the bundle 25' would have an individual connector. Alternatively, a single connector could be utilized for all of the fibers with the fibers then fanning out outside of the optical instrument into the individual fibers with temperature sensors on their ends. In either case, the temperature sensing phosphor need not be physically attached to the fiber, but rather can be attached to another object, with its emissions coupled into its associated optical fiber. A liquid fluorescent dye can alternatively be used.

Figure 4:
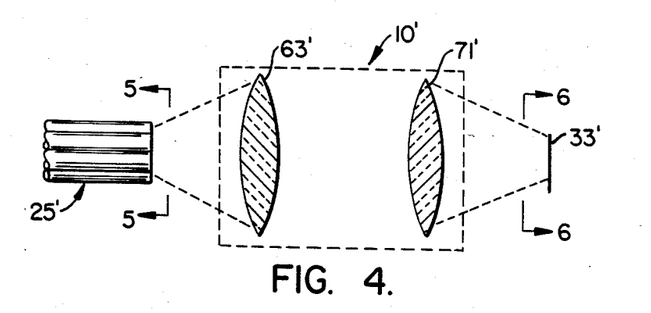
FIG. 4 shows in side view a technique for optically processing multiple sensor signals.

There is a significant advantage of the small, bundled optical fiber arrangement shown in FIGS. 4-6 when used with the intensity ratio type of temperature measurement for which the instrument embodiment of FIGS. 1 and 2 has been described. The optics 10' include everything shown in the optical system 10 of FIG. 2, including the excitation source and the splitting of the luminescent lines onto two detector arrays of the type shown in FIG. 6 for detecting the intensity of the same two lines of luminescence from each of the sensors in the manner that they may be compared for determing the temperature of the sensor.

Figure 7:
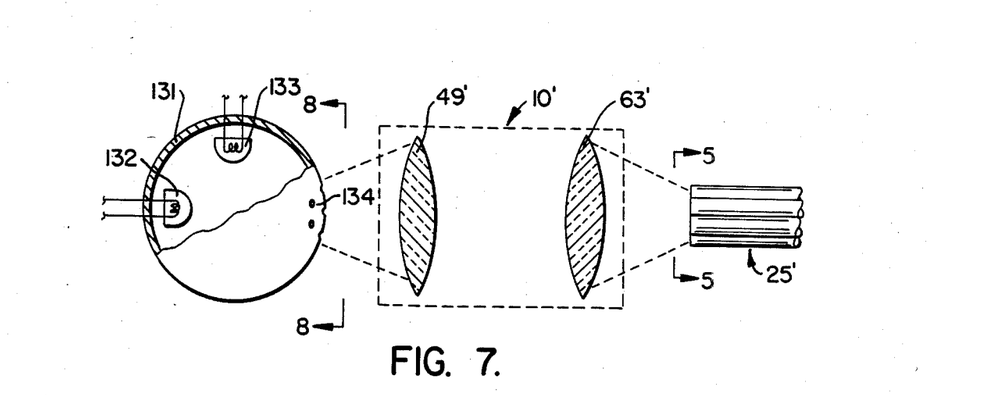
FIG. 7 shows in side view a technique for providing excitation radiation to a plurality of optical fibers.
Figure 8:
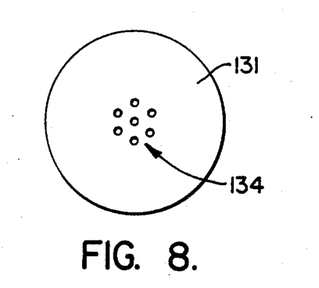
FIG. 8 is a view of the optical system of FIG. 4 taken at section 8—8 thereof.

Similarly to FIGS. 4-6 illustrating the coupling of multiple optical fibers in a bundle 25' to a plurality of detectors 33, FIGS. 7 and 8 show an advantageous way to couple an excitation radiation source into the fiber bundle 25'. A sphere 131 contains two light sources 132 and 133 and is enclosed except for an array of holes 134 that are arranged to match the pattern of optical fibers 25' into which light is to be imaged. An interior surface of the sphere 131 is made to have a high degree of light diffusion and is non-absorptive so that an even high intensity is presented at the apertures 134. By having two light sources 132 and 133, the failure of one source will not cripple operation of the instrument, although only one source is required for operation at any one time. The light sources can be of any convenient type, incandescent, gas discharge, light emitting diode (LED), etc. The use of the integrating sphere 131 makes efficient use of virtually any available light source for even, efficient distribution in a pattern which matches the optical fiber pattern.

Figure 9:
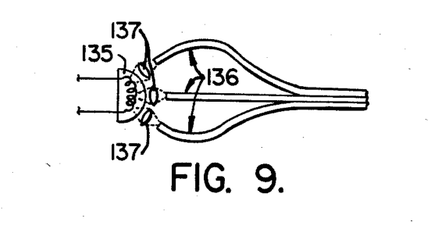
FIG. 9 shows an alternative technique for providing illumination to multiple fibers.
Figure 10:
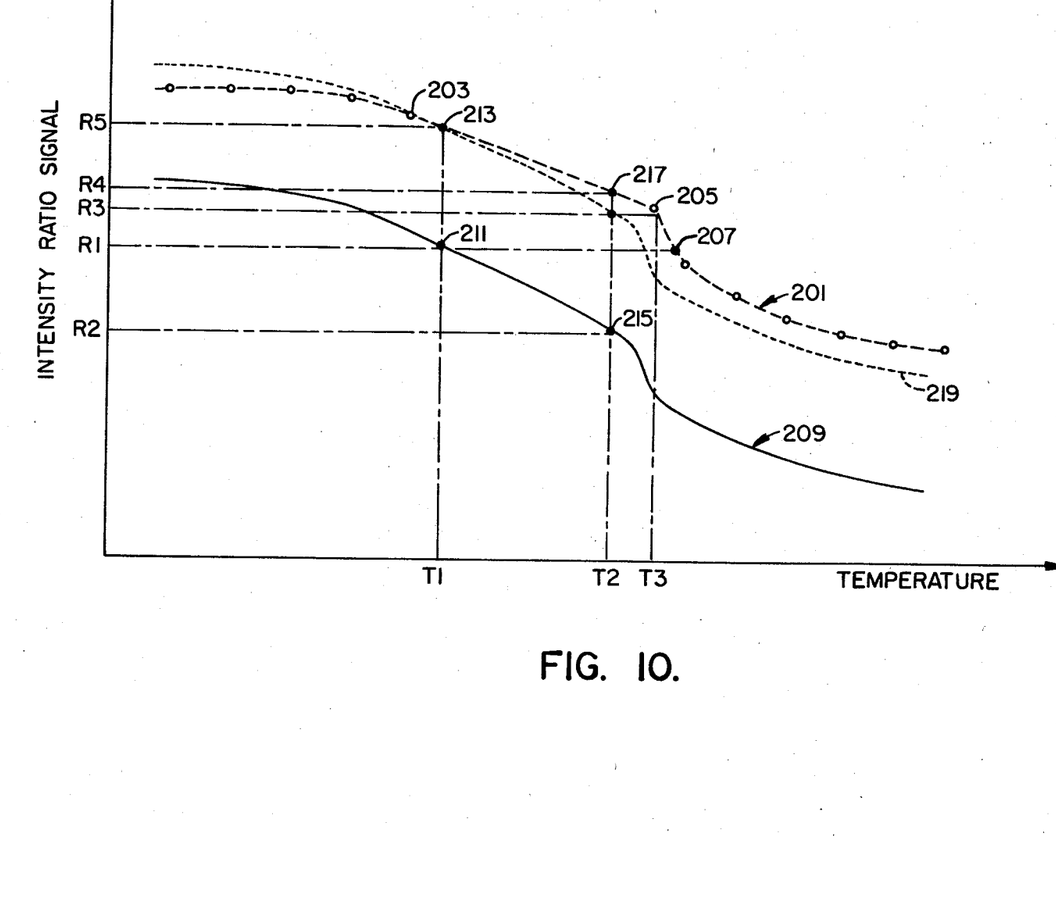
Figure 11:
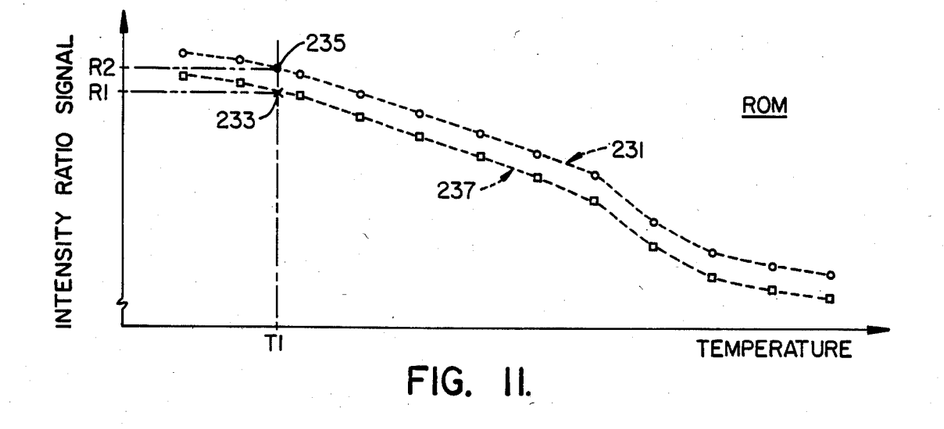
Figure 12:
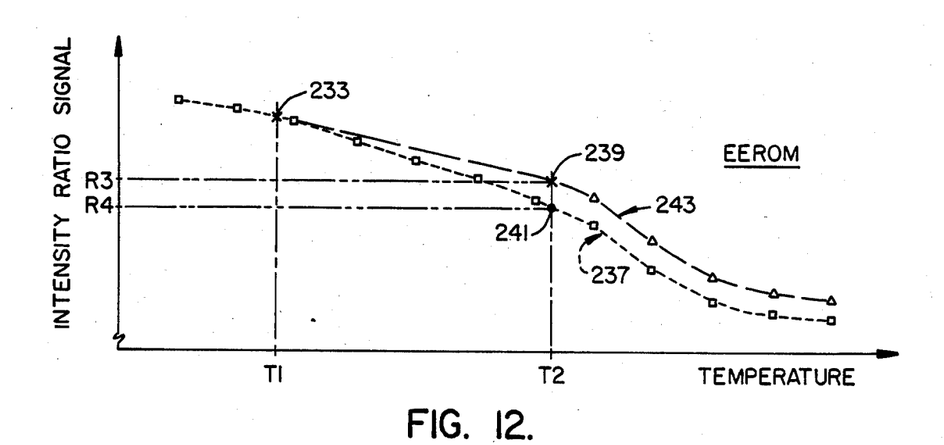
Figure 13:
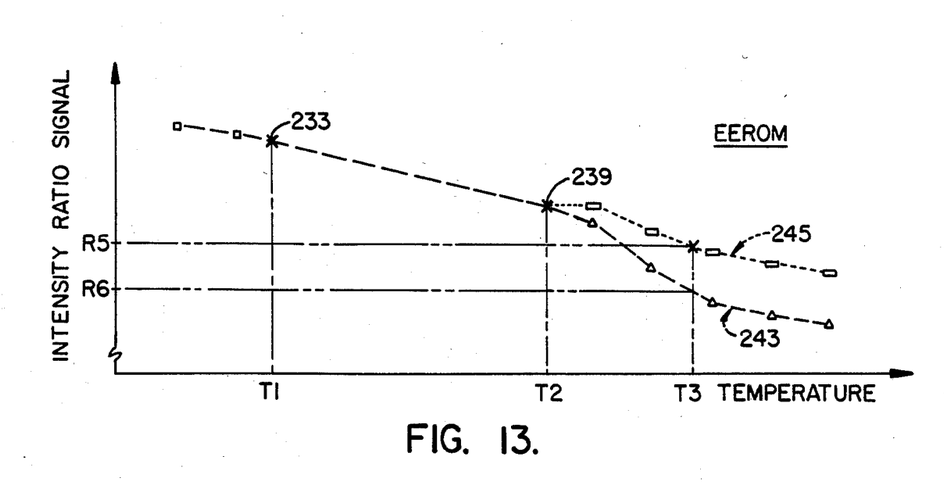
Figure 14:
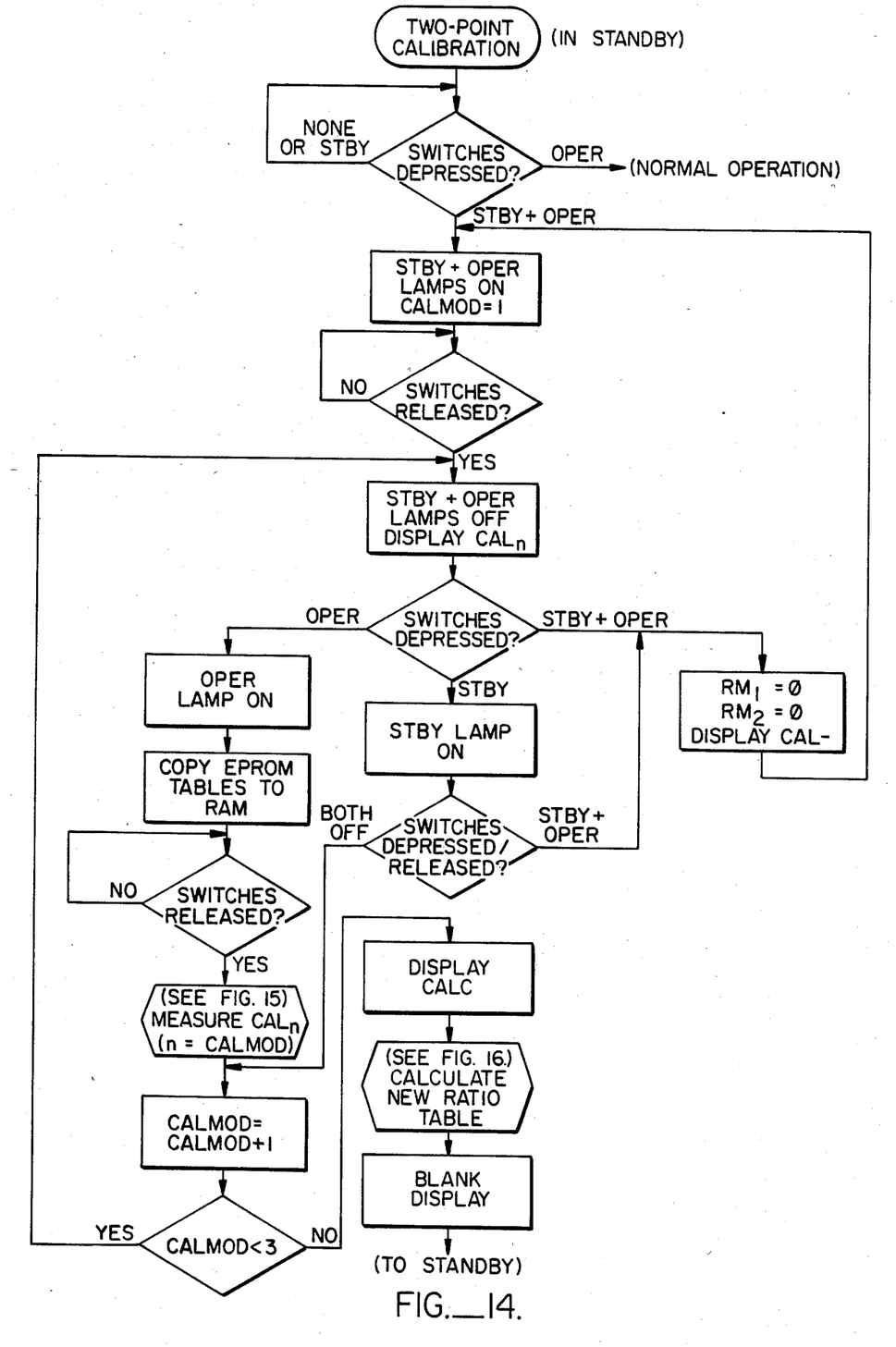

When the systems of FIGS. 4-8 are used together, each of the optical fibers 25' carry both the excitation radiation to its associated phosphor sensor and the luminescent radiation from the sensor to the optical system 10'. If separate fibers are provided for the excitation and emission communication with each sensor, a more conventional fiber illumination arrangement, such as shown in FIG. 9, can be used. A light source 135 can be positioned directly in front of excitation fibers 136, but it is preferable to interpose lenses 137 therebetween to maximize light efficiency.

In any of the specific optical fiber arrangements described, one or two fibers of each bundle may be used for continuous calibration, if desired. An end of any such calibration fiber carrying the phosphor probe can be left in one of the temperature wells 111 or 112. It a second calibration fiber of a bundle is employed, its sensor can be placed in the other well. The instrument can then be calibrated according to the techiques discussed below.

An alternative source arrangement includes attaching separate sources, such as LED's, to the ends of a plurality of short fibers. The other fiber ends are then bundled to provide the desired source intensity pattern that can be substituted for the pattern of apertures 134 in the system of FIG. 7. Yet a different source is a multi-segment LED whose segments directly produce the desired source pattern shown in FIG. 8, the LED segments forming a pattern that corresponds to that of the holes 134. The LED pattern is then imaged directly onto the fiber bundle 25' (FIG. 7), one segment per fiber, taking the place of the sphere 131.

In either of these two specific LED arrangements, the opportunity for electrical modulation of the excitation source or sources is available. This facilitates sophisticated detection schemes at the detectors, such as synchronous or lock-in detection, phase angle measurement between excitation and sensor, etc. An example of such a system is shown in FIG. 9A. With appropriately chosen different modulation of each of the individual source elements by a modulator 301 having individual energization circuits 303 connected to specific light elements (that make up the source 134') for each sensor fiber or fibers, it is possible to substitute a single element detector 33" for the multi-detector array 33' (FIGS. 4 and 6) and still obtain independent information for each sensor. In this case, all of the fibers 25" are imaged onto the detector element 33". An optical system 10" interconnects the sensor fibers, excitation source and detector. A single electronic signal output of the detector 33" is demodulated by a circuit 305 into individual signals in lines 307 corresponding to the optical signals of the various sensors. For certain modulation/demodulation techniques, but not all, a linking circuit 309 will be provided for synchronization of the circuits 301 and 305.

One such modulation technique is to modulate each excitation LED at a unique frequency and then electrically or digitally analize the output of the single common detector to recover the various signals corresponding to each sensor. If the source modulation frequencies are not harmonically related (that is, no one frequency is an integer multiple of another), then lock-in synchronous detection, either electrical or digital, provides an efficient means of separating the detected sensor signals. Still another modulation and detection scheme using a single detector and multiple excitation LED's is to pulse each LED or LED segment to emission at a separate time and assign the response at the common detector to the sensor which has been excited.

Although the various aspect of the present invention have been described with respect to a particular optical temperature sensing technique and specific instrument implementation, it will be understood that the invention is entitled to protection within the full scope of the appended claims. Many variations and generalizations of the specific techniques described with respect to the drawings are possible. For example, the referencing and calibration techniques described are useful even where ratioing is not employed and, in fact, are essential in those applications since no part of certain degradation over time is automatically corrected. Also, the referencing and calibration devices and techniques are useful in instruments that employ other phosphor temperature dependent characteristics, such as in line wavelength shift or decay time techniques. Various other types of phosphors may be substituted for those described in the examples, and other non-phosphor temperature sensing materials that change some detectable optical characteristics can also benefit from the techniques of this invention. Further, the techniques described also have application to acquisition and processing of optical signals obtained from measurement transducers other than temperature, such as pressure, flow, stress, stain and similar other parameters.

I claim:
1. In an optical condition measuring system adapted to provide a separate condition indication from a plurality of independent optical signals that are each separately carried by at least one of a plurality of optical fibers from one end to another end thereof, an improved optical signal processing system, comprising:
means grouping together said another end of said plurality of optical fibers in a given cross-sectional pattern for forming said plurality of light signals in said pattern,
an array of light detectors arranged substantially in said given cross-sectional pattern for a separate detector to receive the light from said another end of a different at least one of said plurality of optical fibers, and a signal receiving optical system positioned to image onto said array of detectors through at least one common optical element the grouped light signals from said another end of said optical fibers.

2. The improved optical conditioning measuring system according to claim 1 wherein said detector array includes a plurality of separate discrete detector components, each with a segment of detector optical fiber having one end positioned in optical communication with said detector and said another end positioned in a group with all others at a location to receive through the optical system an image of the light signals to be detected.

3. The improved optical condition measuring system according to claim 1 wherein said array of detectors comprises said individual detectors being arranged at a surface wherein said optical system forms an image of the closely grouped light signals.

4. The improved optical condition measuring system according to claim 1 wherein said optical system includes means for simultaneously directing electromagnetic radiation into siad another end of each of the plurality of optical fibers whereby said electromagnetic radiation is communicated to said one end of each of the optical fibers.

5. The improved optical condition measuring system according to claim 1, additionally having an illumination source comprising:

a light source having useful intensity levels in substantially said given pattern, and a light transmitting optical system positioned to image into said another end of the optical fibers through at least one common optical element the given intensity pattern whereby light from said source is communicated to said one end of each of said optical fibers.

6. The improved optical condition measuring system according to claim 5 wherein said light source comprises a light enclosed chamber having one or more illumination elements therein, a diffusely reflective inner surface and a plurality of apertures arranged in substantially said given pattern.

7. The improved optical condition measuring system according to claim 5 wherein said at least one common optical element of each of said signal receiving optical system and said light transmitting optical signal comprises at least one optical element common to both systems.

8. The improved optical condition measuring system according to claim 1 wherein said at least one common optical element includes a lens having an optical axis, and wherein the given pattern of said another end of the plurality of optical fibers is positioned along said optical axis.

9. The improve optical condition measuring system according to claim 1 wherein each of a plurality of temperature sensors is maintained in optical communication with a different one of said plurality of optical fibers at its said one end, said temperature sensor including a luminescent material that is characterized by emitting, when excited, luminescent radiation that is proportional to the temperature of said sensor.

10. The improved optical condition measuring system according to claim 5 wherein each of a plurality of temperature sensors is maintained in optical communication with a different one of said plurality of optical fibers at its said one end, said temperature sensor including a luminescent material that is characterized by emitting, when excited by said light source, luminescent radiation that is proportional to the temperature of said sensor.

11. The improved optical condition measuring system according to claim 9 wherein each of at least some of said sensors are connected to a separate optical fiber connected between it and an excitation light source.

* * * * *

UNITED STATES PATENT AND TRADEMARK OFFICE
CERTIFICATE OF CORRECTION

PATENT NO. : 4,558,217
DATED : Dec. 10, 1985
INVENTOR(S) : Alves

It is certified that error appears in the above-identified patent and that said Letters Patent is hereby corrected as shown below:

Delete Figures 10 through 20;

Col. 9, line 25: "siad" should read --said--;

Col. 9, line 35: insert --,-- after "pattern" and before "whereby"; and

Col. 10, line 19: replace "improve" with --improved--.

Signed and Sealed this

Eleventh Day of March 1986

[SEAL]

Attest:

DONALD J. QUIGG

Attesting Officer

Commissioner of Patents and Trademarks